Dec. 19, 1950   R. E. FROOM   2,534,662
DEVICE FOR ATTACHING PROPELLER SPINNERS
Filed Nov. 13, 1948
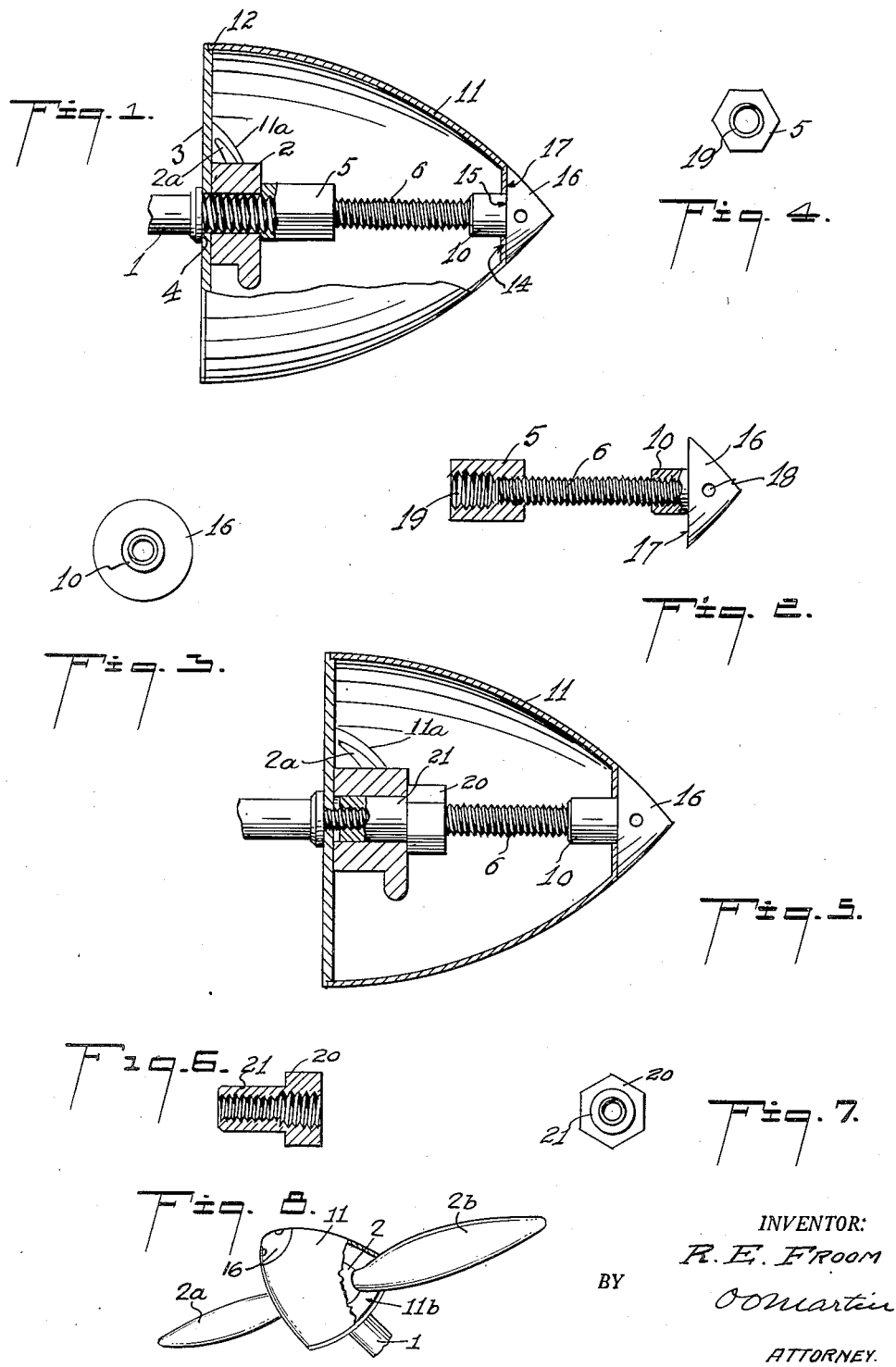
INVENTOR:
R. E. Froom
BY
O. O. Martin
ATTORNEY.

Patented Dec. 19, 1950

2,534,662

UNITED STATES PATENT OFFICE 2,534,662

DEVICE FOR ATTACHING PROPELLER SPINNERS

Randall E. Froom, Glendale, Calif.

Application November 13, 1948, Serial No. 59,805

2 Claims. (Cl. 170—159)

This invention relates to propeller hub spinners for aircraft and has particular reference to a device for mounting such spinners in position on the propeller hub.

The device of the invention is primarily designed for use on model airplanes and it is the object of the invention to provide improved fastening devices including adapters by means of which spinners of different sizes may readily be clamped in position on the various types of model airplanes now in use. To this end the invention resides in the combinations hereinafter described and reference is invited to the accompanying drawings in which preferred forms of the invention are illustrated.

In the drawings:

Fig. 1 shows an airplane spinner, the shell of which is partly broken away in order to disclose my improved method of mounting such spinner in position on the end of a propeller shaft;

Fig. 2 shows a fastening device similar to the one shown in Fig. 1 as it appears when detached from the propeller shaft;

Fig. 3 is an inner end view of the clamping element of the fastening device, appearing at the right end of Fig. 2;

Fig. 4 is a rear end view of the adapter element of the invention;

Fig. 5 illustrates a slightly modified form of the invention;

Figs. 6 and 7 are detail views of the adapter element thereof; and

Fig. 8 is an outline of the device of Fig. 1 showing the relation of the propeller blades to the spinner of the device.

Referring in the first instance to Fig. 1, the numeral 1 denotes the end of an airplane propeller shaft on the screw threads of which a propeller hub 2 is mounted and propeller blades 2ª, 2ᵇ extend from this hub in any conventional manner. It is noticed that a circular disc 3 is placed between this hub and a shoulder 4 of the propeller shaft. An element 5, which conveniently may be termed the adapter of the device, is shown seated on the threaded end of the propeller shaft and the opposite end of this adapter is, in Fig. 2, shown threaded to receive a rod 6, the outer end of which is provided with screw threads of a size to receive thereon a clamping member 10. The screw threads at both ends of this rod are of the same size and I generally find it more convenient to extend these screw threads over the entire length of the rod.

Spinners for model airplanes are generally conoidal in shape and such spinner is, as indicated at 11 in Fig. 1, seated in a peripheral recess 12 of the disc 3. Notches 11ª, 11ᵇ are sunk into the inner edge of this spinner of a size to clear the inner ends of the propeller blades, substantially as indicated in the drawings. The shell of the spinner is near the front end thereof pressed or spun inward to provide a flat face 14, the central portion of which is perforated as indicated at 15. The clamping member 10 consists of a hub the rear end of which is internally threaded to ride on the screw threads of the rod 6. The outer end of the member is shown enlarged to form a conoidal head 16, the flat inner surface 17 of which comes to rest against the face 14 of the spinner when the member extends therethrough to engage the rod 6. For the purpose of drawing the spinner tightly in position against the disc 3, a perforation 18 is transversely drilled through the head 16 of a size to receive a pin or other suitable tool by means of which the parts may be tightly clamped together.

The purpose of mounting a spinner on the propeller hub of an airplane is to streamline the front end thereof and the conoidal shape in Fig. 1 has been found most effective for this purpose. It is also common practice in assembling such spinners to extend a stem from the end of the propeller shaft through the front end of the spinner and to mount a clamping element such as an ordinary hexagon nut on the end thereof; but while such nut is sufficient to clamp the spinner in position on the propeller shaft, it is bulky and fails to provide the streamlining which is so essential in devices of this type. I have found it necessary, in order to obtain perfect streamlining so to shape the outer surface of the head 16 that it will continue the conoidal contour of the spinner and come to a point directly in front thereof.

The front end of the propeller shafts of model airplanes are generally threaded and the screw threads thereof vary in size. It is, for this reason, necessary to provide some means for adapting the clamping elements of the invention to the various sizes of screw threads on the ends of the propeller shafts and I have found it most convenient for this purpose to provide an adapter element such as the one indicated at 5. The end of this element in which the rod 6 is seated, will remain the same in all cases but the threads 19 at the other end thereof will be of a size to fit the threads of any of the model airplane propeller shafts on the market at the present time. In other words, while the rod 6 and the clamping member 10 will always remain unchanged, there will be a special adapter for each type of model airplane to which the spinner is attachable. In some cases, it may also be found necessary, where the projecting end of the propeller shaft is shorter, to provide an adapter having a shank extending into the propeller hub opening, substantially as indicated in Figs. 5 to 7.

This adapter is made with an enlarged hexagonal portion or head 20 and a shank 21 of a length to extend nearly the entire distance through the propeller hub. As above stated, the diameter of the threaded end of the propeller shaft varies with the different makes of model aircraft. As illustrated in Figs. 5 and 6, the end of the shaft is smaller, but it is to be understood that it may be of the same size as the rod 6 or even larger, for example as indicated in Fig. 2, and that the outer diameter of shank 21 will vary correspondingly.

From the foregoing, it is seen that, with the few parts illustrated in the drawings and above described, I am enabled to provide spinner assemblies for the many different makes of model airplanes on the market at the present time. These assemblies are easy to mount on the airplane propeller and will provide the streamlining so essential in devices of this kind.

I claim:

1. A propeller shaft having screw threads on the outer end thereof and provided with a shoulder at the base of said screw threads, a circular base plate seatable on the screw threads of the shaft, a conoidal spinner, a cylindrical clamping member seated in the front end of the spinner and having a conoidal head of a size and shape to continue the outline of the spinner, there being a threaded recess in the inner end of the member, a threaded rod seated in the threads of said recess and extending to the front end of the propeller shaft, and an adapter element engaging the threads of the rod and the threaded front end of the shaft, the element being rotatable on the threads of the shaft to lock the spinner base plate in position thereon, the member being rotatable on the threads of the rod to lock the spinner in position on the base.

2. A propeller shaft having screw threads on the outer end thereof and provided with a shoulder at the base of said screw threads, a circular base plate seatable on the screw threads of the shaft, a conoidal spinner, said spinner terminating at the front in an inturned perforated flange parallel with said base, a cylindrical clamping member seated in the perforated front end of the spinner and having a conoidal head of a size and shape to rest against said flange and to continue the outline of the spinner, there being a threaded recess in the inner end of the member, a threaded rod seated in the threads of said recess and extending to the front end of the propeller shaft, and an adapter element engaging the threads of the rod and the threaded front end of the shaft, the element being rotatable on the threads of the shaft to lock the spinner base plate in position thereon, the member being rotatable on the threads of the rod to lock the spinner in position on the base.

RANDALL E. FROOM.

REFERENCES CITED

The following references are of record in the file of this patent:

UNITED STATES PATENTS

| Number | Name | Date |
|---|---|---|
| 1,668,972 | McCauley | May 8, 1928 |
| 1,730,742 | Nelson | Oct. 8, 1929 |
| 1,773,319 | Rauen | Aug. 19, 1930 |
| 1,801,725 | Cook | Apr. 21, 1931 |

FOREIGN PATENTS

| Number | Country | Date |
|---|---|---|
| 257,227 | Great Britain | Oct. 14, 1926 |
| 301,340 | Germany | Apr. 30, 1919 |
| 517,834 | France | Dec. 22, 1920 |